(12) United States Patent
Kato et al.

(10) Patent No.: US 7,776,467 B2
(45) Date of Patent: Aug. 17, 2010

(54) INTER-BATTERY CONNECTION DEVICE

(75) Inventors: Masahiko Kato, Kanagawa (JP); Takahiro Fukuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/994,720

(22) PCT Filed: Feb. 1, 2006

(86) PCT No.: PCT/JP2006/301677
§ 371 (c)(1), (2), (4) Date: Sep. 12, 2008

(87) PCT Pub. No.: WO2007/004335
PCT Pub. Date: Jan. 11, 2007

(65) Prior Publication Data
US 2009/0123830 A1    May 14, 2009

(30) Foreign Application Priority Data
Jul. 5, 2005    (JP) .............................. 2005-196012

(51) Int. Cl.
*H01M 2/24* (2006.01)
(52) U.S. Cl. .................. 429/160; 429/158; 429/159
(58) Field of Classification Search .......... 429/158–160
See application file for complete search history.

(56) References Cited

U.S. PATENT DOCUMENTS 5,985,480 A * 11/1999 Sato et al. ..................... 429/65
D450,653 S * 11/2001 Hertel et al. ................. D13/119
2005/0079408 A1 * 4/2005 Hirano ........................ 429/82

FOREIGN PATENT DOCUMENTS

| JP | 2002-184385 | | 6/2002 |
| JP | 2002-246003 | | 8/2002 |
| JP | 2003-229102 | | 8/2003 |
| JP | 2004-127554 | | 4/2004 |
| JP | 2004-171856 | | 6/2004 |
| JP | 2004-227954 | | 8/2004 |
| JP | 2004-265610 | | 9/2004 |
| JP | 2004127554 | * | 4/2009 |

\* cited by examiner

*Primary Examiner*—Dah-Wei D Yuan
*Assistant Examiner*—Patricia Davis
(74) *Attorney, Agent, or Firm*—McDermott Will & Emery LLP (57) ABSTRACT

An inter-battery connection device for connecting terminals of two batteries (1a, 1b) arranged with their axes parallel to each other. The inter-battery connection device includes an inter-battery connection plate (11) that connects the battery case bottom (2) and the sealing plate (3) of the two batteries. The inter-battery connection plate (11) includes welding portions (4) at the ends of its base plate (6) for welding to the case bottom (2) and the sealing plate (3), respectively. An intermediate metal plate (7) is joined to the middle part of the base plate (6) between the welding portions (4, 4) to form an intermediate portion (5) having a greater thickness than each welding portion (4). The inter-battery connection device has reduced electric resistance while achieving improved weldability.

2 Claims, 9 Drawing Sheets

INTER-BATTERY CONNECTION DEVICE

RELATED APPLICATIONS

This application is the U.S. National Phase under 35 U.S.C. §371 of International Application No. PCT/JP2006/301677, filed on Feb. 1, 2006, which in turn claims the benefit of Japanese Application No. 2005-196012, filed on Jul. 5, 2005, the disclosures of which Applications are incorporated by reference herein.

TECHNICAL FIELD

The present invention relates to an inter-battery connection device for connecting terminals of batteries arranged in parallel.

BACKGROUND ART

In recent years, electronic equipment such as AV devices, personal computers and portable communication devices is rapidly made portable and cordless. For a driving power source of these electronic devices, nickel cadmium storage batteries, nickel metal-hydride storage batteries, lithium secondary batteries and the like have been typically used since they have high reliability and easy maintainability. These batteries are also used in various other applications, particularly increasingly used as driving power sources in power-assisted bicycles, lawn mowers, electric vehicles and other applications where large load characteristics are required. Thus, there is a much need for batteries that have larger current charge/discharge performance suitable for use as driving power sources in these applications.

Figure 12:
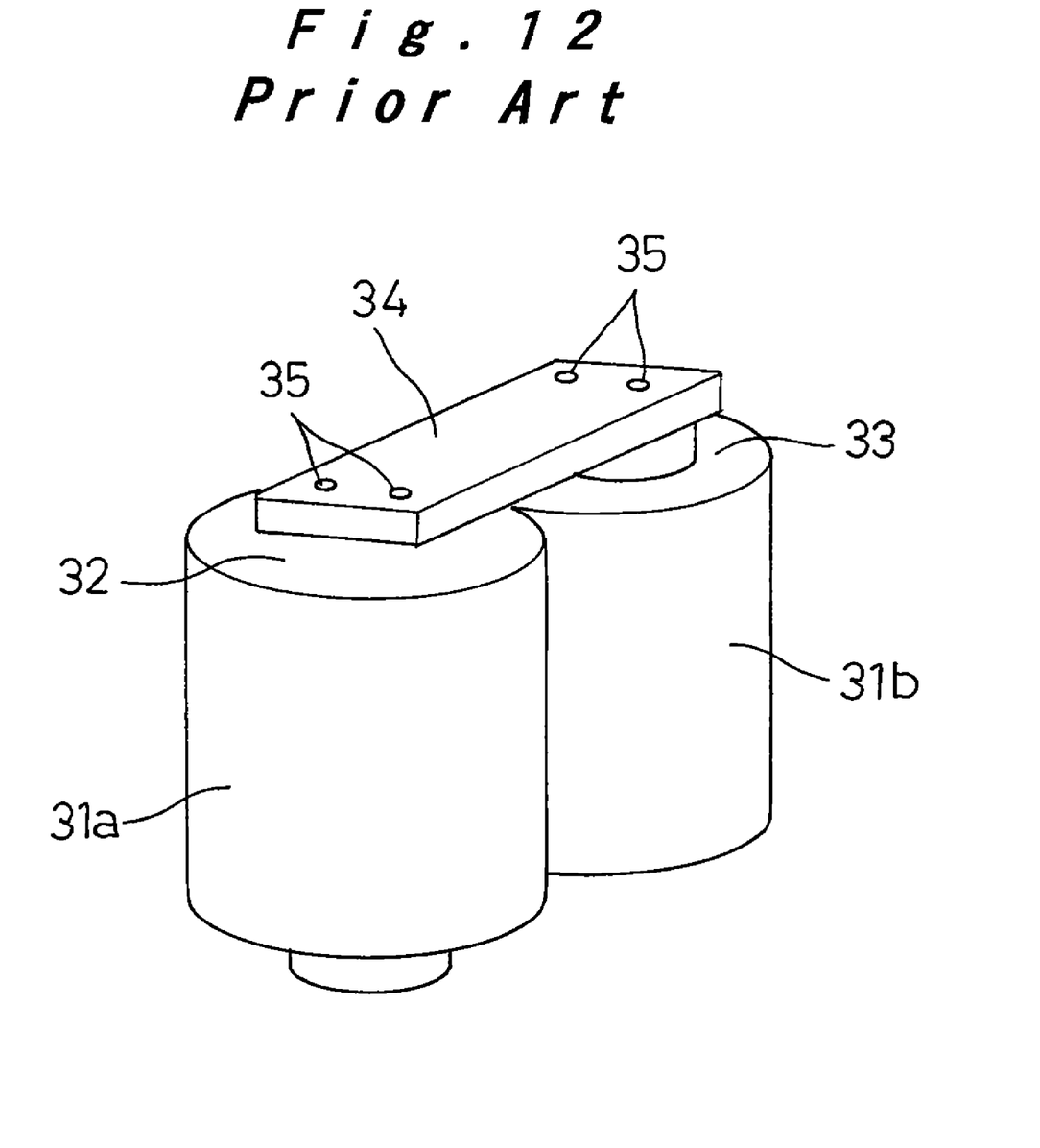
FIG. 12 is a perspective view showing the manner in which batteries are connected in a conventional inter-battery connection device.

The battery for use as driving power sources is typically assembled as a battery pack or a battery module in which multiple batteries are connected mutually between different polarities. Traditionally, an inter-battery connection plate 34 as shown in FIG. 12 has been used to connect batteries. The inter-battery connection plate 34 consists of a metal plate obtained by cutting a hoop-like metal into predetermined lengths. Specifically, the connection areas at the both ends of the inter-battery connection plate 34 are connected via the welds 35 to the case bottom 32 of the battery 31*a* and to the sealing plate 33 of the battery 31*b* respectively.

A battery connection member is also known that consists of a single plate having a first connection area that comes into contact with the bottom of one cell and a second connection area that is formed as an annular recess or a step that comes into contact with the sealing plate of the other cell (Refer, for example, Patent Document 1).

Patent Document 1: Japanese Patent Application Laid-Open No. 2002-246003

DISCLOSURE OF THE INVENTION

Problems To Be Solved By The Invention

In order to adapt the structure of the battery pack or the battery module shown in FIG. 12 to even larger current discharge, either the thickness or the width of the inter-battery connection plate 34 needs to be increased. Since it is difficult to make the width of the inter-battery connection plate 34 greater than the diameter of the sealing plate 33, the option is to increase the thickness of the inter-battery connection plate 34. However, increasing the plate thickness decreases the weldability of the connection plate to the battery case or the sealing plate. Also, when two battery modules are linearly connected at one of their ends, the two modules are positioned so that their end surfaces are aligned on the same plane. If either of the end surfaces is not precisely level with the plane, the thick inter-battery connection plate 34 cannot properly follow the stepped profile of the connected end surfaces.

As a result, peeling occurs at the welds, increasing the electric resistance. In addition, increasing the plate thickness may result in the deformation of the battery case or the sealing plate. Furthermore, the thick inter-battery connection plate requires excessive energy for welding, which may cause the formation of holes in the battery case.

An alternative to increasing the thickness of the inter-battery connection plate is to replace the material of the inter-battery connection plate with a metal having a low specific resistance, such as copper. However, the inter-battery connection plate with a decreased specific resistance cannot achieve sufficient weldability, nor can it ensure the strength of welds.

Likewise, the battery connection member disclosed in Patent Document 1 needs to have an increased thickness in order to adapt to large current discharge. However, increasing the thickness of the connection member may decrease the weldability of the connection member to the bottom of the battery case, reduce the strength of welds, and cause the formation of holes at the welds in the bottom surface of the case. In addition, the thick battery connection member cannot follow the stepped profile of the connected end surfaces.

Accordingly, it is an object of the present invention to provide an inter-battery connection device that can achieve high weldabiliy while reducing electric resistance.

Means For Solving The Problems

To achieve the foregoing object, an inter-battery connection device of the present invention for connecting terminals of two batteries arranged with their axes parallel to each other includes welding portions at its both ends for welding to the terminals of the respective batteries and an intermediate portion that connects the two end welding portions and has a thickness greater than that of each welding portion.

In this construction, the thick intermediate portion between the welding portions serves to reduce the electric resistance between the two connected batteries and is ideal for large current charge/discharge. Since the surface area of the inter-battery connection device increases as its thickness increases, the thick intermediate portion facilitates heat release and reduces the effects of heat. Thus, the inter-battery connection device of the present invention has an electric resistance significantly lower than that of conventional inter-battery connectors. The inter-battery connection device of the present invention can therefore be used to make high power battery packs or battery modules. Furthermore, the thinner end welding portions are flexible enough to follow the stepped profile of the welded end surfaces of the battery terminals and help reduce the shunt current that flows during resistance welding. As a result, strong welds can be formed and, thus, the inter-battery connection device achieves high weldabiliy.

The inter-battery connection device may include a base plate and the intermediate portion that is joined to the base plate. The base plate includes one or more metal plates of the same or different materials joined together and includes the welding portions at its both ends. The intermediate portion includes one or more metal plates of the same or different materials joined together. Preferably, the one or more metal plates that form the intermediate portion are joined together by crimping a bundling band or a claw member that extends from the base plate on each side of the intermediate portion, or by means selected from resistance welding, ultrasonic welding, laser welding and friction stir welding.

The inter-battery connection device may be obtained by forging or grinding a metal plate of a predetermined thickness to make the welding portions thinner than the intermediate portion.

The inter-battery connection device may include a connection plate and a connection ring. The connection plate has at one end thereof a welding portion for welding to the sealing plate of one battery and a connection arm that has a approximately uniform thickness and extends from its intermediate portion to the other end of the connection plate. The connection ring forms other welding portion for welding to the bottom of the battery case of the other battery. The connection arm is held in contact with the connection ring by means of a retainer member arranged on the connection ring. The retainer member holds the connection arm from above and is joined to the connection arm. The retainer member and the connection arm may be joined together by crimping, welding or any other means.

In this construction, the thin retainer member of the connection ring is joined to the thick connection arm of the connection plate. Thus, the two components can be readily crimped or welded together in a stable and reliable state. This construction therefore eliminates the occurrence of hole formation in the battery case. In addition, the deformation of the retainer member provides the inter-battery connection device with the flexibility required to follow the stepped profile of the welded end surfaces of the batteries. Moreover, the distance between the axes of the batteries can be adjusted with a high degree of freedom by adjusting the amount of insertion of the connection arm between the upper surface of the connection ring and the retainer member.

Preferably, the connection ring is fitted to the periphery of the bottom of the battery case by welding to the outer periphery of the battery case. Since the outer periphery of the battery case is less susceptible to deformation than its bottom surface, the quality of welding can be stabilized and the reliability of welding ensured without causing hole formation in the battery case.

The material for use in the inter-battery connection device of the present invention preferably includes at least one selected from nickel, iron, copper, and iron or copper treated with nickel on at least one surface thereof.

The welding portion preferably includes a central opening, a plurality of notches arranged about the opening, and a plurality of projections arranged between the notches for welding to the battery terminal by resistance welding. The notches serve to make the welding portion flexible between the notches so that the welding portion can readily and reliably fit to the battery terminal. The notches also serve to prevent the reactive current that flows during welding. The projections arranged between the notches ensure physical contact between the welding portion and the battery terminal and thereby achieve reliable welding. While the notches may be formed to a depth so that the welding pieces containing the projections remain partially connected, they are preferably deep enough to completely separate the individual welding pieces. In this manner, the shunt current can be prevented from flowing between adjacent welding pieces (projections).

Although each projection may be formed as a dot-like circular projection (as viewed from the top), it may be formed as a straight or curved linear projection. In this manner, the area for welding can be increased, resulting in decreased connection resistance and increased strength of welds.

BRIEF DESCRIPTION OF THE DRAWINGS

FIGS. 6A to 6C show an inter-battery connection device in a second embodiment of the present invention, with FIG. 6A being a perspective view showing the manner in which batteries are connected; FIG. 6C an end view.

BEST MODE FOR CARRYING OUT THE INVENTION

Several embodiments of the inter-battery connection device of the present invention will now be described with reference to FIGS. 1 through 11B.

First Embodiment

Figure 1:
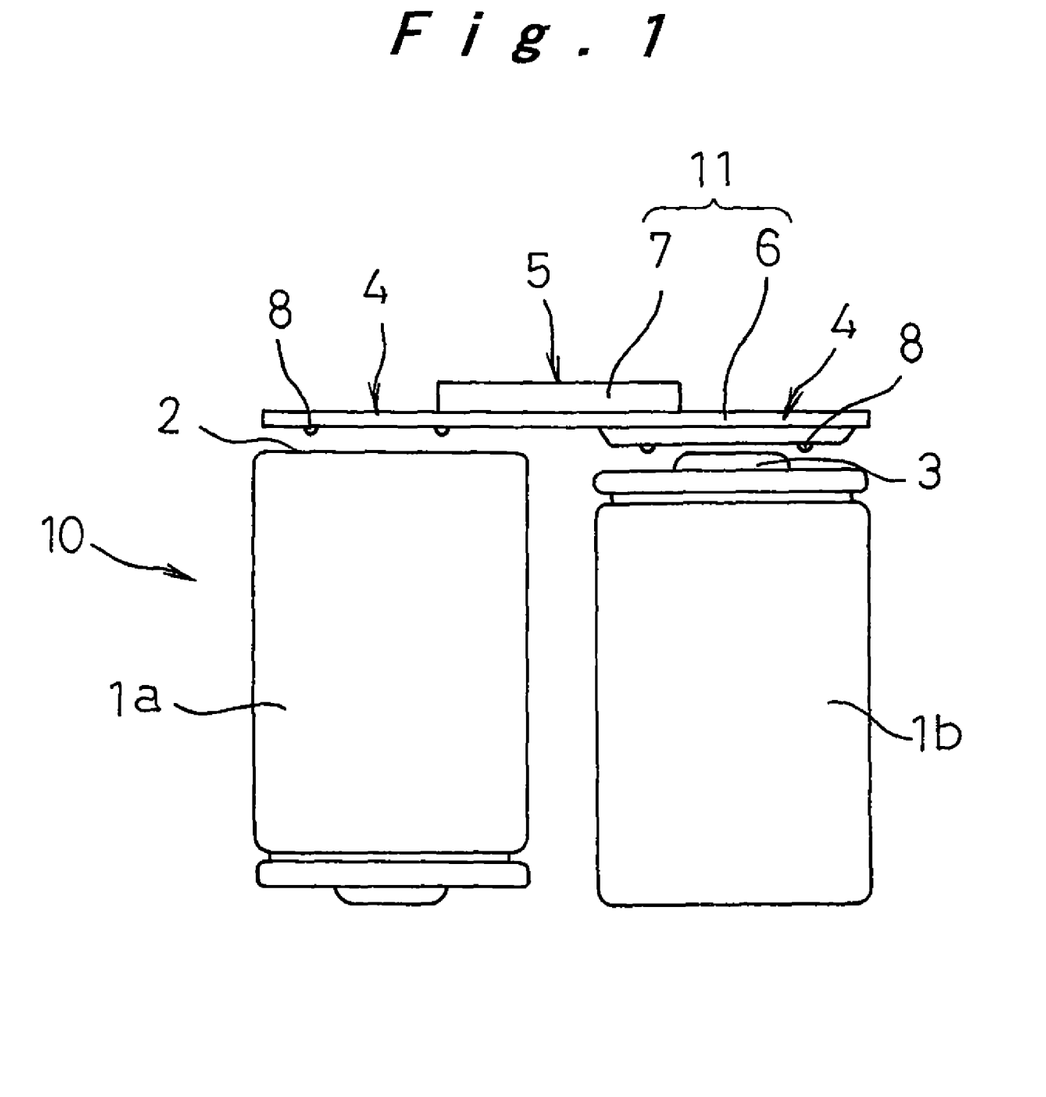
FIG. 1 is a front view showing a connection step of the inter-battery connection device in a first embodiment of the present invention.

A first embodiment is first described with reference to FIGS. 1 through 5. FIG. 1 is a front view showing a connection step of a battery pack. A battery pack 10 consists of two batteries 1a, 1b and an inter-batter connection plate 11, as an inter-battery connection device, for connecting between the terminals of the batteries 1a, 1b with different polarities (specifically, between a battery case bottom 2 and a battery sealing plate 3). The inter-battery connection plate 11 is composed of welding portions 4, 4 arranged at its both ends and an intermediate portion 5 connecting the end welding portions 4, 4. The intermediate portion 5 is formed thicker than each welding portion 4. In FIG. 1, the inter-battery connection plate 11 is composed of a base plate 6 including the end welding portions 4, 4 and an intermediate metal plate 7 joined to the base plate 6 at the intermediate portion 5.

Each end welding portion 4 includes projections 8. The end welding portions 4 are connected to the battery case bottom 2 and the battery sealing plate 3, respectively, via the projections 8.

By employing the thick intermediate portion 5 in the inter-battery connection plate 11, the electric resistance of the inter-battery connection plate 11 can be decreased without increasing the thickness of the welding portions 4. As a result, the welding portions 4 remain less susceptible to the effect of the shunt current that flows during resistance welding. In addition, the welding portions 4 achieve high weldability by retaining flexibility required to adapt to the deformation caused by the heat and pressure generated during welding.

Figure 2A:
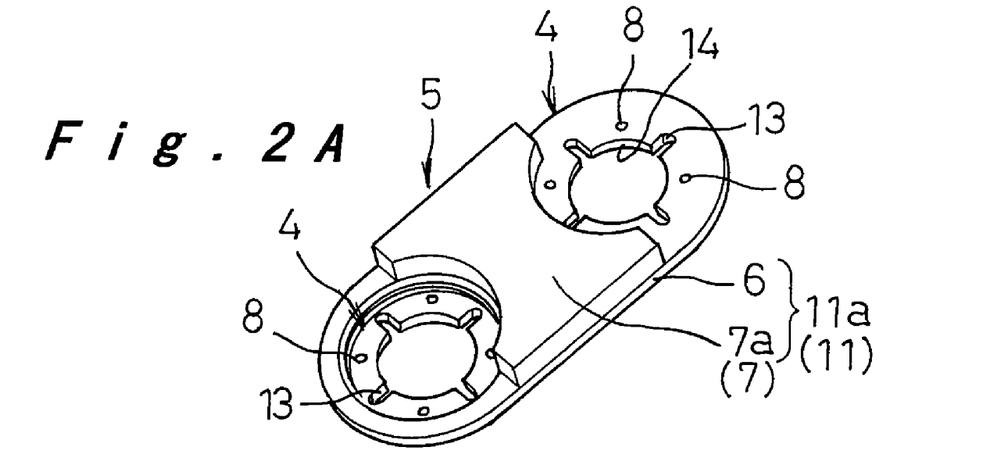
FIGS. 2A to 2C are each a perspective view showing a specific example of the inter-battery connection plate of the first embodiment.
Figure 2B:
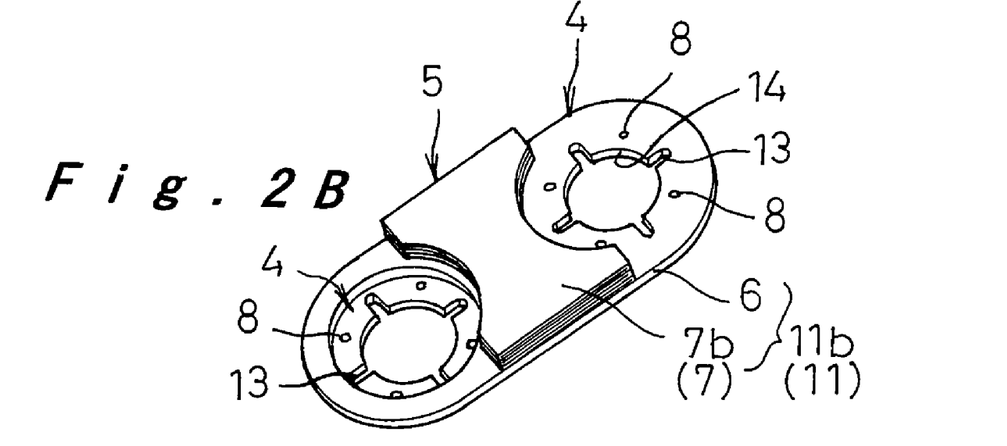
Figure 2C:
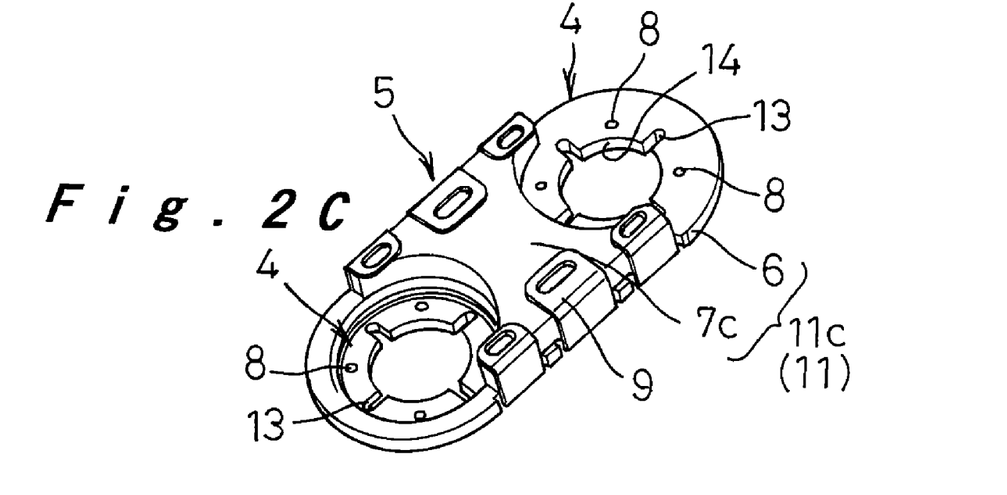

FIGS. 2A to 2C show several specific examples of the inter-battery connection plate 11 each consisting of a base plate 6 and an intermediate metal plate 7 joined to the base plate 6 to form an intermediate portion 5. An inter-battery connection plate 11a as shown in FIG. 2A includes a single intermediate metal plate 7a joined to the middle part of a base plate 6 to form an intermediate portion 5. An inter-battery connection plate 11b as shown in FIG. 2B is composed of a multilayer intermediate metal plate 7b joined to the middle part of a base plate 6. The intermediate metal plate 7b is composed of multiple thin metal plates stacked and joined together. As for the inter-battery connection plates 11a, 11b, the base plate 6 and the intermediate metal plate 7a or 7b or the thin metal plates to form the intermediate metal plate 7b in the intermediate potion 5 may be joined together by any of resistance welding, ultrasonic welding, laser welding and friction stir welding.

By joining the metal plates 7a, 7b to the middle part of the base plate 6, the electric resistance of the inter-battery connection plates 11a, 11b can be reduced without losing the weldability of the welding portions 4, 4 at the ends of the base plate 6. Furthermore, the intermediate metal plate 7b of the inter-battery connection plate 11b that is composed of a stack of thin metal plates has an increased surface area that facilitates heat dissipation and, thus, the reduction of electric resistance. In addition, the intermediate metal plate 7b has a flexibility required to follow the stepped profile of the end surfaces of the two connected batteries 1a, 1b.

An inter-battery connection plate 11c in FIG. 2C includes an intermediate metal plate 7c that is fastened to the middle part of a base plate 6 by crimping claw members 9. The claw members 9 are formed to extend from the side edges of the base plate 6 of the inter-battery connection plate 11c. Instead of crimping the claw members 9, the intermediate metal plate 7 may be fastened by a bundling band (not shown) to make the inter-battery connection plate.

The base plate 6 and the intermediate metal plate 7 (7a, 7b, 7c) of the inter-battery connection plates 11 shown in FIGS. 2A to 2C may be made of the same material or different materials. The material preferably is of nickel, iron, copper, or iron or copper coated with nickel. The nickel coating may be applied to iron or copper by cladding or plating.

Figure 3:
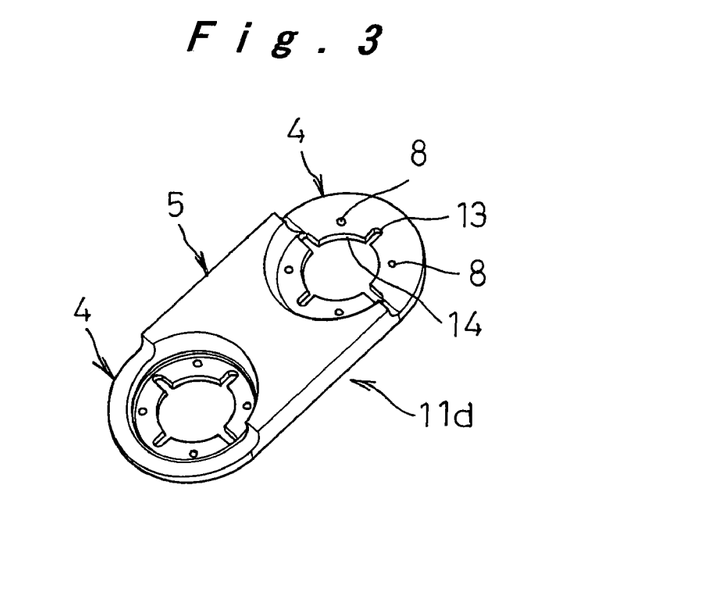
FIG. 3 is a perspective view showing another example of the inter-battery connection plate of the first embodiment.

An inter-battery connection plate 11d in FIG. 3 is made by forging or grinding a metal plate of a predetermined thickness to form welding portions 4 that are thinner than the intermediate portion 5. The inter-battery connection plate 11d provides similar advantages to each of the examples shown in FIGS. 2A to 2C and yet can be easily produced at low production cost.

The inter-battery connection plate 11d shown in FIG. 3 is preferably made of nickel, iron or copper. Copper and iron may be plated with nickel after processing so as to improve the corrosion resistance and the weldability.

Figure 4:
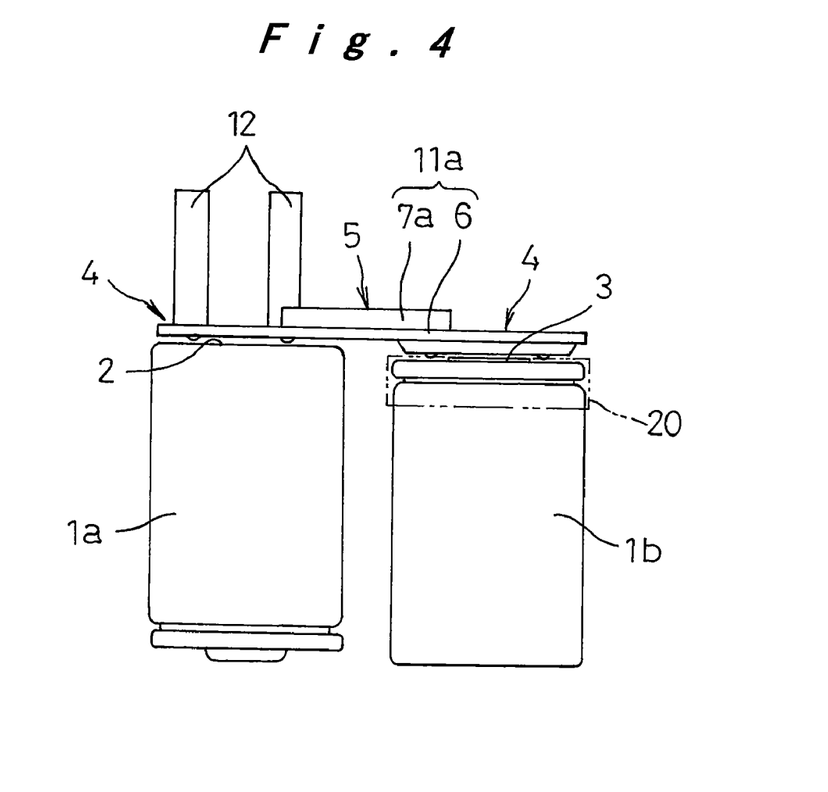
FIG. 4 is a front view showing a welding step of the inter-battery connection plate in the first embodiment.

FIG. 4 is a front view showing the manner in which two batteries 1a, 1b arranged parallel to each other are connected by resistance welding using the inter-battery connection plate 11a of the present embodiment. As indicated by an imaginary line, an insulation ring 20 is fitted about the positive electrode terminal of the battery 1b to prevent the short circuit between the sealing plate 3 and the battery case through the inter-battery connection plate 11a. Projections 8 formed on the surface of the welding portions 4 ensure the strength and reliability of welds. The resistance welding is preferably carried out by series welding by placing a pair of welding electrodes 12 against the projections 8 formed on the both sides of notches 13 that are formed to prevent reactive current during welding (See, FIGS. 2A to 2C and FIG. 3). When the welding portion 4 is welded to the battery case bottom 2 of the battery 1a, the welding may be done by indirect welding. Specifically, this is done by holding one of the welding electrodes 12, in contact with the battery case bottom 2 through an opening 14 formed at the center of each welding portion 4 (See, FIGS. 2A to 2C and FIG. 3), and holding the other electrode in contact with the projection 8.

Figure 5:
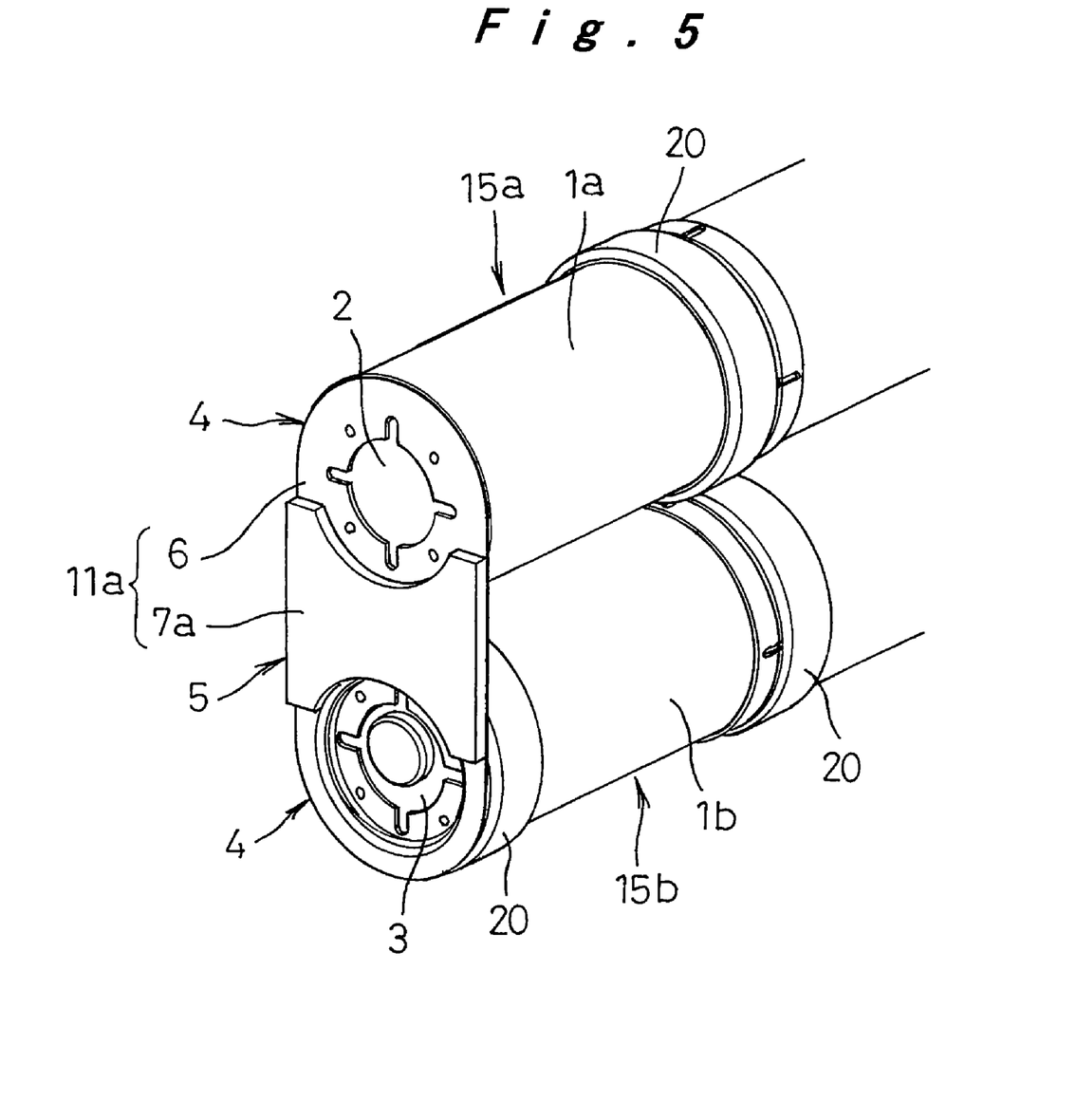
FIG. 5 is a perspective view showing a battery module connected in the first embodiment.

FIG. 5 shows one example in which the inter-battery connection plate 11a shown in FIG. 4 is used to connect two battery modules 15a, 15b.

Second Embodiment

A second embodiment is now described with reference to FIGS. 6A through 10. Unlike the first embodiment of the inter-battery connection device, which is composed of a single inter-battery connection plate 11, the inter-battery connection device of the second embodiment is composed of two components, a connection plate 16 and a connection ring 18, joined together. In the following description, the same components as those in the first embodiment are denoted by the same reference numerals and their description will not be repeated.

Figure 6A:
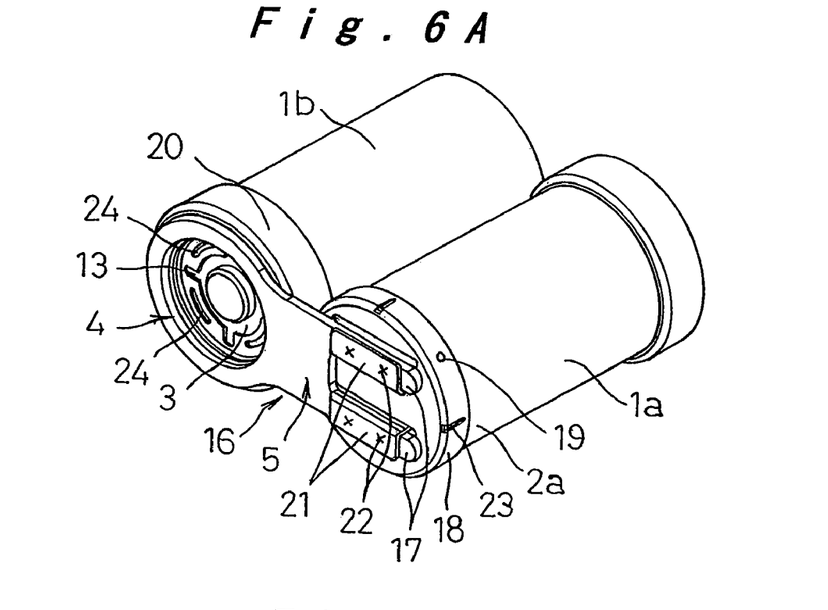
Figure 6B:
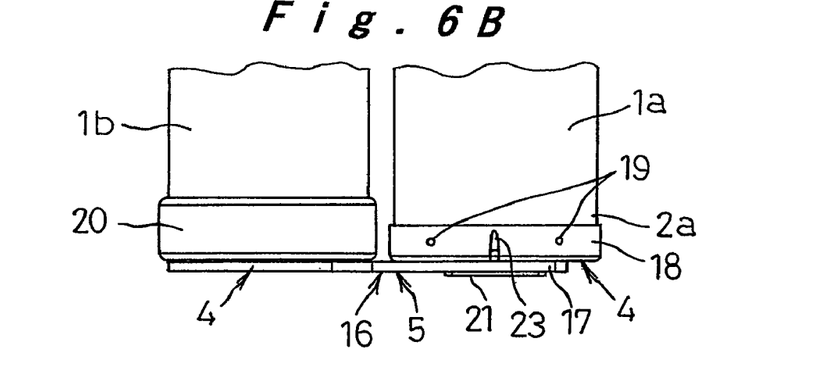
FIG. 6B a plan view showing major components.
Figure 6C:
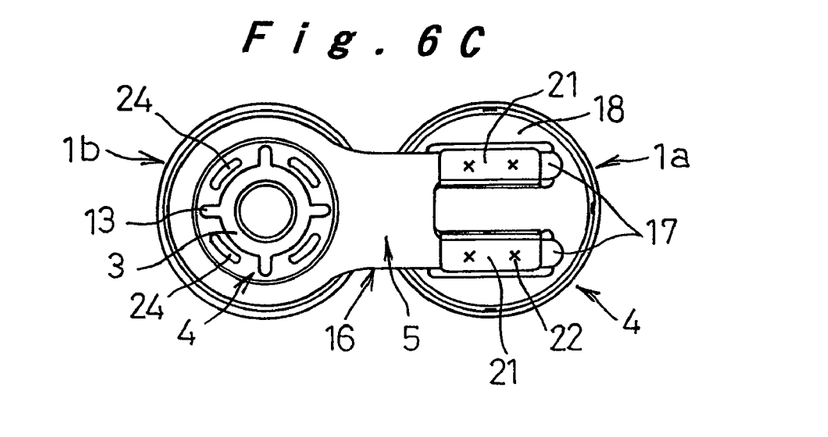

As shown in FIGS. 6A to 6C, the inter-battery connection device of the second embodiment includes a connection plate 16 and a connection ring 18. The connection plate 16 includes at one end thereof a thin welding portion 4 for welding to the sealing plate 3 of a battery 1b. The connection plate 16 also includes a thick intermediate portion 5 and a connection arm 17 that has a uniform thickness and extends from its intermediate portion 5 to the other end of the connection plate 16. The connection ring 18 is thin and forms the other welding portion 4 for welding to the battery case bottom 2a of a battery 1a. The connection ring 18 is a substantially circular disk-shaped member fitted to the periphery of the battery case bottom 2a of the battery 1a and is secured to the outer periphery of the battery case bottom 2a by resistance welding at multiple welding spots 19 arranged on its side wall. A notch 23 is formed between the welding spots 19, 19 to prevent the reactive current during welding. A pair of retainer members 21, each having an L-shaped cross-section, is formed by a cutting-and-bending process on the end wall of the connection ring 18 to hold the connection arm 17. The connection arm 17 is held in place by being inserted between the end wall of the connection ring 18 and the retainer members 21. The retainer members 21 are integrally welded to the connection arm 17 at welding spots 22 from the side of the retainer member 21.

Figure 7:
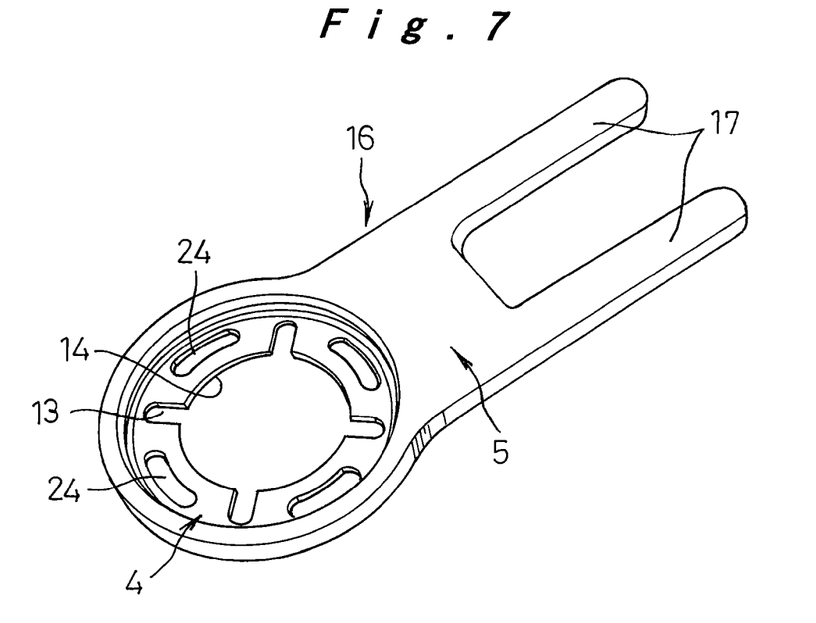
FIG. 7 is a perspective view of a connection plate of the second embodiment.

As shown in FIG. 7, the thin welding portion 4 of the connection plate 16 is shaped with projecting to abut the sealing plate 3 and includes multiple curved projections 24 that are arranged around the opening 14 with the notches 13 formed in between. The projections 24 serve to ensure the strength and reliability of welds between the welding portions 4 and the sealing plate 3. By welding along the length of the curved projection 24, the weld area can be increased as compared to the dot-like circular projections 8. As a result, the connection resistance can be decreased and the sufficient strength of welds can be ensured. It should be recognized that circular projections 8 may be used in place of curved projections 24 for welding.

A pair of spaced-apart connection arms 17 extends from the sides of the intermediate portion 5 of the connection plate 16. Correspondingly, the connection ring 18 includes two retainer members 21 that are formed by a cutting-and-bending process to have an L-shaped cross-section facing outward and to hold the connection arms 17 from the inside.

Figure 8:
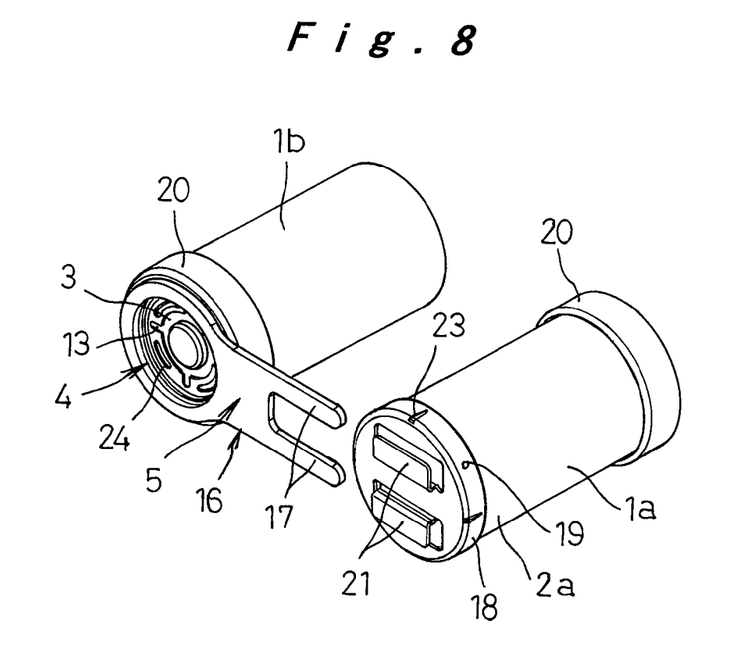
FIG. 8 is a perspective view showing a connection step in the second embodiment in which the connection plate is connected to a connection ring.

In the connection step using the above-described inter-battery connection device as shown in FIG. 8, the connection ring 18 is welded to the battery case bottom 2a of the battery 1b of the two batteries 1a, 1b that are to be connected. Upon connection, the welding portion 4 of the connection plate 16 is welded to the sealing plate 3 of the battery 1a to secure the connection plate 16 to the battery 1a. The connection arms 17 of the connection plate 16 are then inserted into the respective retainer members 21 of the connection ring 18, so that the connection arms 17 are held in contact with the connection ring 18 by the retainer members 21 that hold the connection arms 17 from above. The distance between the batteries 1a and 1b and the relative orientation of the axes of the batteries 1a, 1b are then adjusted. Subsequently, the welding spots 22 are welded by resistance welding to firmly connect the batteries 1a and 1b. In this manner, the sealing plate 3 and the battery case bottom 2a are electrically connected with a small electric resistance.

According to the second embodiment, the connection ring 18 is fitted to the periphery of the battery case bottom 2a of the battery 1b and welded to the outer periphery of the battery case bottom 2a. Since the outer periphery of the battery case bottom 2a is less susceptible to deformation than its bottom surface, the quality of welding can be stabilized and the reliability of welding ensured without causing hole formation in the battery case. Since the thin retainer member 21 of the connection ring 18 is welded to the thick connection arm 17 of the connection plate 16, the two components can be welded together in a stable and reliable state. This construction therefore eliminates the occurrence of hole formation in the battery case. In addition, the deformable retainer members 21 provide the inter-battery connection device with the flexibility required to follow the stepped profile of the end surfaces of the connected batteries 1a, 1b. Moreover, the distance between the axes of the batteries 1a, 1b can be adjusted with a high degree of freedom by adjusting the amount of insertion of the connection arms 17 between the upper surface of the connection ring 18 and the retainer members 21.

Figure 9:
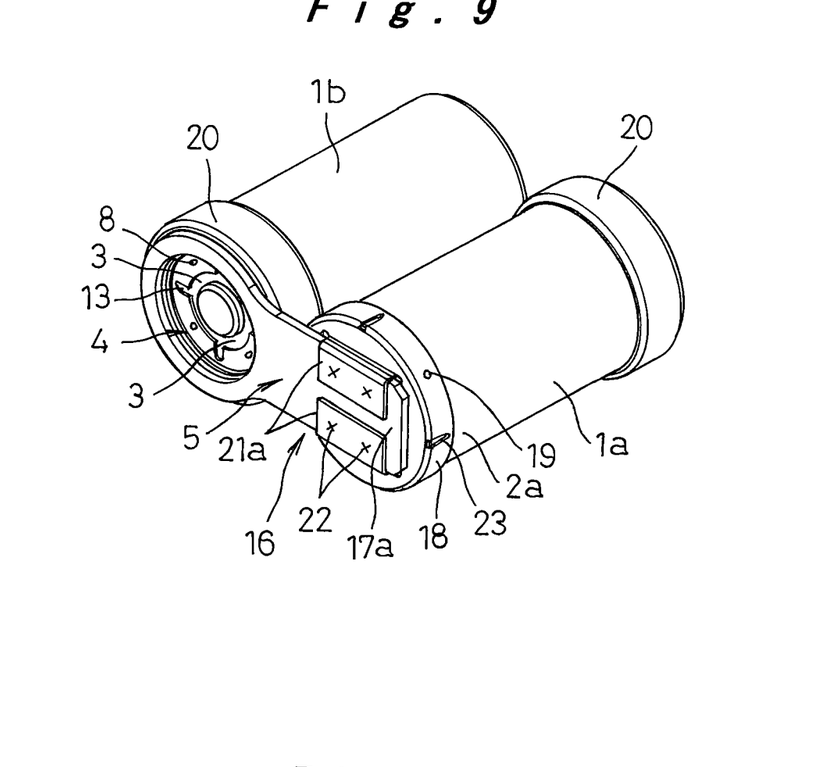
FIG. 9 is a perspective view showing the manner in which batteries are connected in a modified example of the second embodiment.
Figure 10:
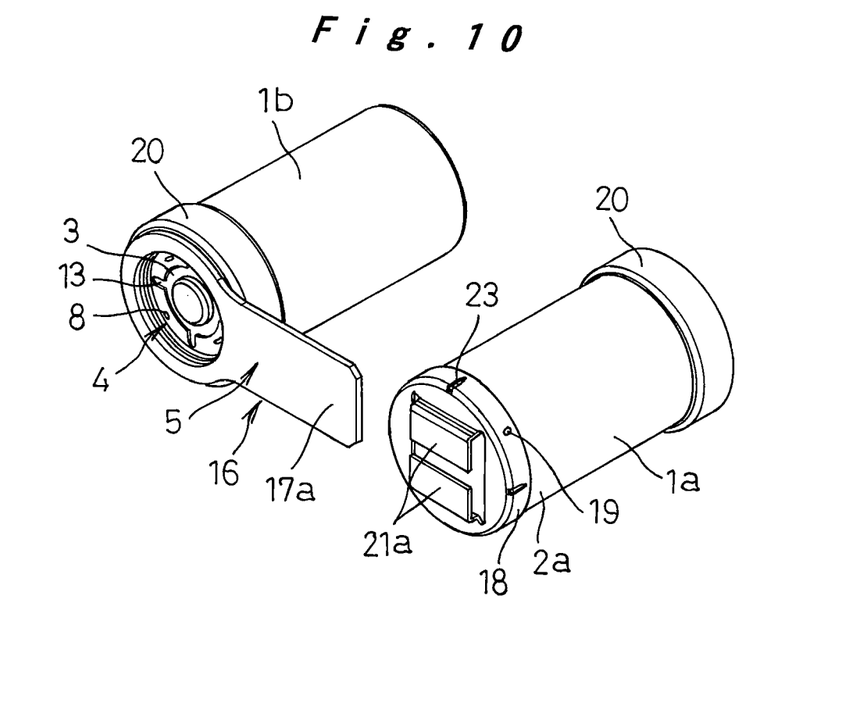
FIG. 10 is a perspective view showing a connection step in the modified example in which the connection plate is connected to the connection ring.

Although in the example shown in FIGS. 6A through 8, the connection plate 16 includes a pair of connection arms 17 that extend from the sides of the intermediate portion 5 toward the other end of the connection plate 16 and the connection ring 18 includes a pair of retainer members 21 facing outward, as shown in FIGS. 9 and 10, the connection plate 16 may include a single connection arm 17a that has a substantially uniform width and extends from the intermediate portion 5 toward the other end of the connection plate 16 and the connection ring 18 may include a pair of retainer members 21a that are facing inward. In this manner, the pair of retainer members 21a holds the connection arm 17a from the outside of the connection arm 17a. It should be recognized that, as is the case with the first embodiment, the circular projections 8 of the welding portion 4 used in this example may be substituted for curved projections 24.

EXAMPLE

An inter-battery connection plate lla as shown in FIG. 2A was used to connect batteries 1a, 1b to make a battery pack as one example of the present invention. The inter-battery connection plate 11a was prepared by joining (by any of resistance welding, ultrasonic welding, friction stir welding and laser welding) a 2.6 mm-thick intermediate metal plate 7a made of nickel-plated iron to the middle part of a 0.4 mm-thick base plate 6 made of nickel to form an intermediation portion 5 with a total thickness of 3.0 mm.

In the connection step using the inter-battery connection plate 11a, two welding electrodes 8 were placed against the projections 8 in the welding portions 4 of the inter-battery connection plate 11a as shown in FIG. 4. One of the welding portions 4 was then welded to the battery case bottom 2 of the one battery 1a with a diameter of 32 mm while the other welding portion 4 was similarly welded to the sealing plate 3 of the other battery 1b. This completed a battery pack using the inter-battery connection plate 11a.

CONVENTIONAL EXAMPLE

For comparison purposes, a battery pack using a 0.4 mm-thick inter-battery connection plate made of nickel with no intermediate metal plate attached thereto was prepared (Conventional Example A), as was a battery pack using a 0.6 mm-thick inter-battery connection plate made of nickel-plated iron (Conventional Example B).

The three battery packs of Example and Conventional Examples A and B were compared by analyzing the electric resistance of the connection plate and the welding current required during welding of the inter-battery connection plate to the battery case and the sealing plate.

TABLE 1

| Battery packs | Inter-battery connection plate | | Intermediate metal plate | | Welding current | Electric resistance of connection plate |
|---|---|---|---|---|---|---|
| | Materials | Thickness | Materials | Thickness | | |
| Example | Nickel | 0.4 mm | Iron (Ni plated) | 2.6 mm | 4 kA | 0.21 mΩ |
| Conventional Example A | Nickel | 0.4 mm | — | — | 4 kA | 0.26 mΩ |
| Conventional Example B | Iron (Ni plated) | 0.6 mm | — | — | 6 kA | 0.27 mΩ |

As shown in Table 1, the battery pack prepared by using the inter-battery connection plate 11a of Example, in which a 2.6 mm nickel-plated iron plate was joined to form the intermediation portion 5, had the lowest electric resistance. This is because the specific resistance of the intermediate metal plate 7a is low and the resistance of the pathway between two batteries decreases as the thickness of the inter-battery connection plate increases. Thus, the battery pack of Example has a reduced electric resistance of the connection plate and achieves high discharge performance.

Despite its greater total thickness as compared to the inter-battery connection plate 34 used in the battery packs of Conventional Examples A and B, the inter-battery connection plate 11a used in the battery pack of Example requires an equal or a smaller welding current during welding to the battery case bottom 2 and the sealing plate 3.

In the battery pack of Example, the greater surface area of the inter-battery connection plate 11a improves its heat release performance. Thus, the inter-battery connection plate 11a generates less heat and has high weldability that ensures stable welding. As a result, the increase in the connection resistance due to the peeling of the welding portion 4 can be prevented, as can the misalignment of batteries 1a, 1b caused by the deformation of the battery case bottom 2 or the sealing plate 3 and the hole formation in the battery case caused by welding with excessive energy.

Figure 11A:
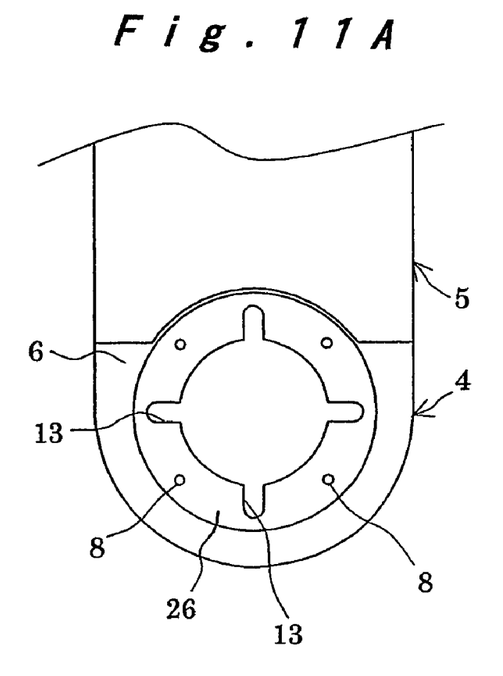
FIGS. 11A and 11B are each an enlarged view showing notches formed in the welding portion of the inter-battery connection plate of the present invention.
Figure 11B:
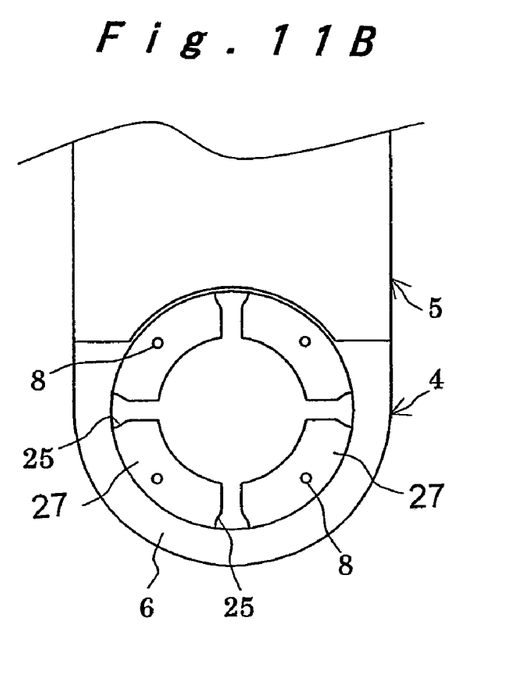

When a pair of welding electrodes 12 are placed against the projections 8 to perform series-welding (See, FIG. 4), a shunt current may flow between the welded projections 8. FIG. 11A shows an enlarged view of the welding portion 4 at one end of the inter-battery connection plates 11a, 11b, 11c shown in FIGS. 2A to 2C. Although in the welding portion 4 shown in FIG. 11A, the welding pieces 26 containing the projections 8 are partially separated by notches 13, the adjacent welding pieces 26 are still partially connected by the remaining portions, through which a shunt current may flow. When the shunt current occurs, the welding current that otherwise flows to the projection 8 for subsequent welding decreases. Not only does this impede the proper welding process, but it also decreases the followability for downscaling of the projections 8 upon welding, resulting in sparks and other defects. To prevent the shunt current, deep notches 25 as shown in FIG. 11B as one example may be formed to completely separate the individual welding pieces 26. This construction prevents the shunt current and improves the followability for downscaling of the projections 8 upon welding and decreases the occurrence of defects during welding, ensuring proper welding.

INDUSTRIAL APPLICABILITY

As set forth, the inter-battery connection device of the present invention, which uses a connection plate that has a thick intermediate portion and can reduce the connection resistance between the connected batteries, is suitably used to provide connection between the battery case and the battery sealing plate in battery packs and battery modules that are used as driving power sources in power-assisted bicycles, lawn mowers, electric vehicles and other applications that require large current charge/discharge performance and, thus, large load characteristics. Having thin welding portions formed at its ends, the connection plate also achieves a flexibility required to follow the stepped profile of the welded end surfaces of the battery terminals while being less susceptible to the shunt current during resistance welding. The connection device of the present invention thus achieves high weldability and ensures firm welding and can be effectively used in high power battery packs and battery modules.

The invention claimed is:

1. An inter-battery connection device for connecting terminals of two batteries arranged with their axes parallel to each other, comprising:

a plate member for connecting the terminals, said plate member comprising:

a connection plate having a welding portion and a connection arm extending from an intermediate portion toward the end of the plate member, the welding portion being formed in a ring-like shape and welded to a sealing plate, and a connection ring forming the welding portion which is welded to a bottom of a battery case of one of said two batteries, wherein the connection arm is held between the connection ring and a retainer member arranged on the connection ring, and is joined to the retainer member.

2. The inter-battery connection device according to claim 1, wherein the connection ring has notches formed on the bottom of the battery case at a position where the connection ring fits in an outer periphery of the battery case and is welded to the outer periphery of the bottom surface.

* * * * *